(12) United States Patent
Parvataneni et al.

(10) Patent No.: US 12,543,068 B2
(45) Date of Patent: Feb. 3, 2026

(54) METHOD AND SYSTEM FOR DEVICE STATUS INTELLIGENCE FUNCTION SERVICE

(71) Applicant: Verizon Patent and Licensing Inc., Basking Ridge, NJ (US)

(72) Inventors: Raghuram Parvataneni, Frisco, TX (US); Parry Cornell Booker, Sunnyvale, TX (US); Medha Joshi, Santa Clara, CA (US); Syed Rehman, Monmouth Junction, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 164 days.

(21) Appl. No.: 18/519,347

(22) Filed: Nov. 27, 2023

(65) Prior Publication Data

US 2025/0175846 A1     May 29, 2025

(51) Int. Cl.
    *G06F 15/173* (2006.01)
    *H04L 47/20* (2022.01)
    *H04L 47/2475* (2022.01)
    *H04W 28/02* (2009.01)

(52) U.S. Cl.
    CPC ......... *H04W 28/0215* (2013.01); *H04L 47/20* (2013.01); *H04L 47/2475* (2013.01)

(58) Field of Classification Search
    CPC ............................ H04L 41/5067; H04L 41/12
    See application file for complete search history.

(56) References Cited

U.S. PATENT DOCUMENTS

2022/0124160 A1* 4/2022 Shariat ................. H04L 67/303
2024/0283714 A1* 8/2024 Pan ...................... H04L 41/5067

* cited by examiner

*Primary Examiner* — Padma Mundur

(57) ABSTRACT

A method, a network device, a system, and a non-transitory computer-readable storage medium are described in relation to an device status intelligence function service. The device status intelligence function service may include event monitoring and notification services. The device status intelligence function service may include generating policies based on application requirements pertaining to an application and an end device. The application requirements may include end device criteria that may be specified by a third party application network device. The device status intelligence function service may include generating a communication profile, based on the policies, that enable end device criteria monitoring in a network. The device status intelligence function service may provide notifications to the third party application network device when requested events occur.

20 Claims, 6 Drawing Sheets

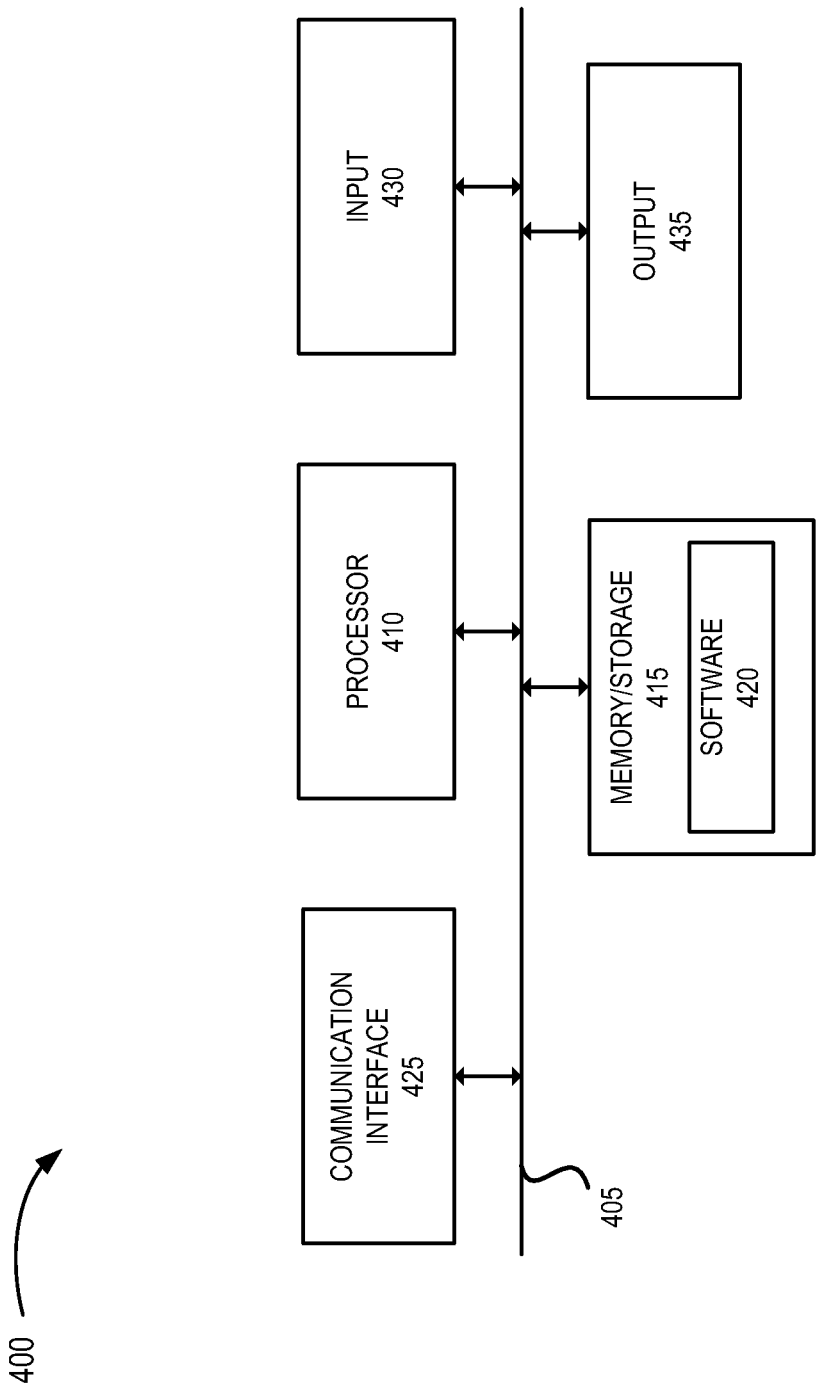

METHOD AND SYSTEM FOR DEVICE STATUS INTELLIGENCE FUNCTION SERVICE

BACKGROUND

Development and design of networks present certain challenges from a network-side perspective and an end device perspective. For example, Next Generation (NG) wireless networks, such as Fifth Generation New Radio (5G NR) networks are being deployed and are under development. End devices may connect to a radio access network (RAN) according to various types of configurations and may be afforded different quality of service (QOS) levels.

BRIEF DESCRIPTION OF THE DRAWINGS

FIG. 4 is a diagram illustrating exemplary components of a device that may correspond to one or more of the devices illustrated and described herein.

DETAILED DESCRIPTION

Figure 1:
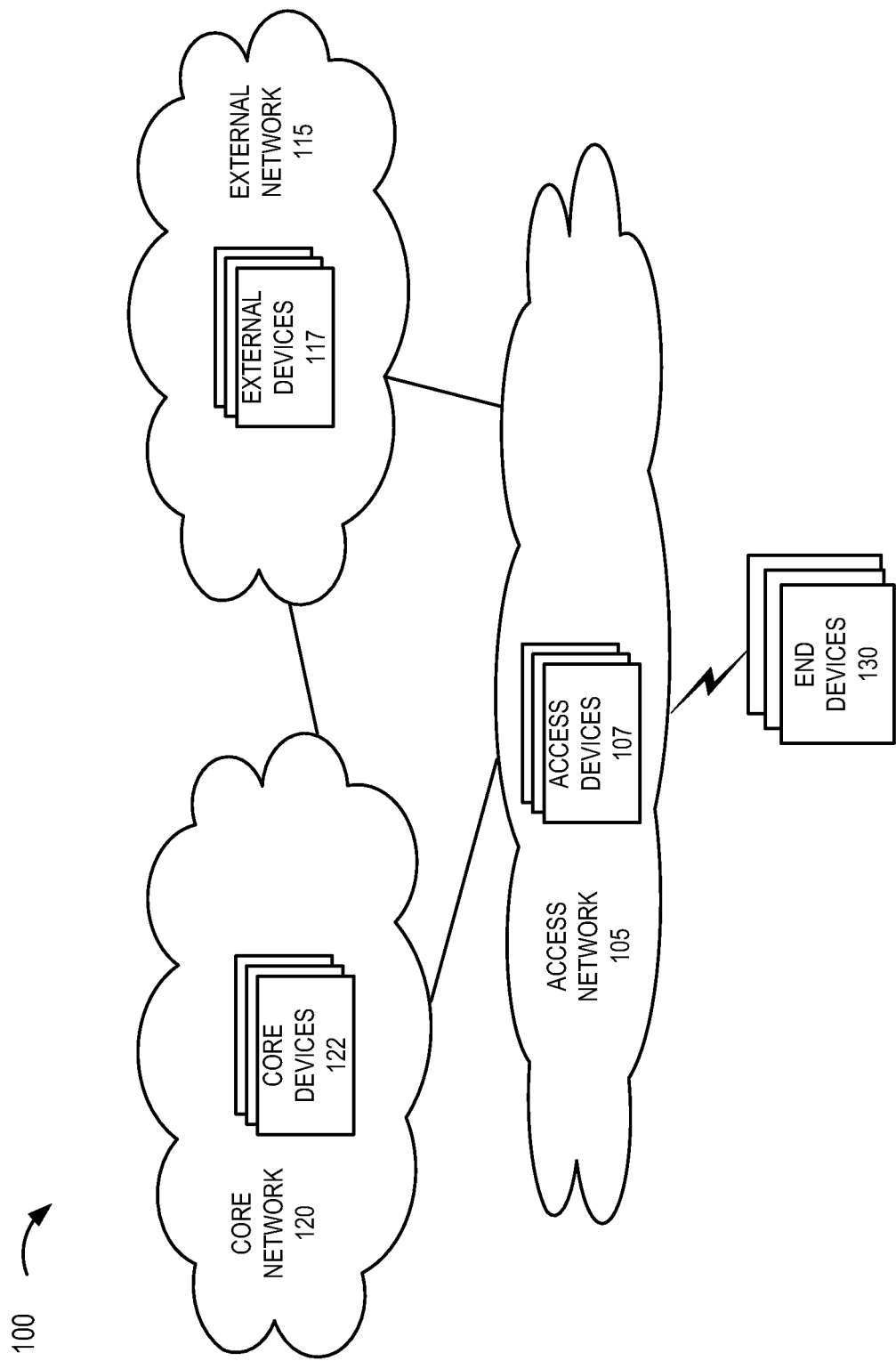
FIG. 1 is a diagram illustrating an exemplary environment in which an exemplary embodiment of a device status intelligence function service may be implemented.

The following detailed description refers to the accompanying drawings. The same reference numbers in different drawings may identify the same or similar elements. Also, the following detailed description does not limit the invention.

There are challenges for a network device, which may host an application service in an application layer network, such as a multi-access edge computing (MEC) network, a cloud network, a data network, or the like, to obtain information that can be used to optimize the experience of users and enhance the application service. The network device may rely on operating system (OS) information associated with an end device, client-side information of the application, and/or other available information pertaining to the end device and/or the application. However, such information may not be available (e.g., end devices that may not include operating systems) or may be quite limited for end devices that are configured as a specific purpose device, such as cameras, and/or other types of end devices that may operate without users.

According to exemplary embodiments, a device status intelligence function service is described herein. The device status intelligence function service may be applied to a wireless environment. For example, the wireless environment may include a Fourth Generation (4G) wireless environment, a wireless local area network (WLAN), a 5G wireless environment, an evolved packet system (EPS)-5G core interworking network, a 4G core network, a 5G core network, and/or a future generation wireless environment, as described herein.

According to various exemplary embodiments, the device status intelligence function service may be implemented to include a network device. For purposes of description, the network device may include a device status intelligence function (DSIF), as described herein. The network device may include functional elements that provide various sub-services of the device status intelligence function service, as described herein.

According to an exemplary embodiment, the device status intelligence function service may provide event monitoring and notification services to an application network device, such as a third party application network device (e.g., a MEC server, a Web server, etc.), as described herein. The device status intelligence function service may enable the subscriber, such as the third party application network device, to specify application requirements that relate to various types of end device criteria data of relevance, as described herein. For example, the end device criteria may pertain to data usage associated with end devices, end device specification data, location-based data, end device activity data, and other types of data, as described herein. The device status intelligence function service may generate policies based on the application requirements. For example, the policies may specify network data that is applicable or corresponding to the end device criteria data and enables determinations whether underlying conditions of the policy are met and what actions are to be performed.

According to an exemplary embodiment, the device status intelligence function service may generate a communication profile based on the policies, as described herein. For example, the device status intelligence service may select network devices and/or systems to monitor, the type of data to request for monitoring, and collection and event notification procedures, as described herein. According to an exemplary embodiment, the device status intelligence function service may receive notification from monitoring network devices, determine when policies have been violated and/or other types of events, as described herein, and determine the appropriate action to be taken. The device status intelligence function service may provide notifications to the subscriber according to the policies configured.

In view of the foregoing, the device status intelligence function service may enable application requirements, which may include end device criteria, to form the basis of policies and event monitoring and notification services. The device status intelligence function service may provide dynamic provisioning of network devices and systems for the event monitoring and notification services. For example, the device status intelligence function service may dynamically identify the type of data to be collected, the selection of network devices and/or systems to monitor and collect the data, and collection and notification procedures, as described herein.

FIG. 1 is a diagram illustrating an exemplary environment 100 in which an exemplary embodiment of a device status intelligence function service may be implemented. As illustrated, environment 100 includes an access network 105, an external network 115, and a core network 120. Access network 105 includes access devices 107 (also referred to individually or generally as access device 107). External network 115 includes external devices 117 (also referred to individually or generally as external device 117). Core network 120 includes core devices 122 (also referred to individually or generally as core device 122). Environment 100 further includes end devices 130 (also referred to individually and generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or another type of network that may support a wireless service and/or an application service, as described herein.

A network device, a network element, or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into distinct types of network architectures (e.g., Software Defined Networking (SDN), client/server, peer-to-peer, etc.) and/or implemented with various networking approaches (e.g., logical, virtualization, network slicing, etc.). The number, the type, and the arrangement of network devices are exemplary.

Environment 100 includes communication links between the networks and between the network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication. A message communicated in support of the device status intelligence function service may use at least one of these planes of communication. Additionally, an interface of a network device may be modified (e.g., relative to an interface defined by a standards body, such as Third Generation Partnership Project (3GPP), 3GPP2, International Telecommunication Union (ITU), European Telecommunications Standards Institute (ETSI), GSM Association (GSMA), etc.) or a new interface of the network device may be provided in order to support the communication (e.g., transmission and reception of messages, information elements (IE), attribute value pairs (AVPs), etc.) between network devices and the device status intelligence function service logic of the network device, as described herein. According to various exemplary implementations, the interface of the network device may be a service-based interface, a reference point-based interface, an Open Radio Access Network (O-RAN) interface, or some other type of interface.

Access network 105 may include one or multiple networks of one or multiple types and technologies. For example, access network 105 may be implemented to include a 5G RAN, a future generation RAN (e.g., a Sixth Generation (6G) RAN, a Seventh Generation (7G) RAN, or a subsequent generation RAN), a centralized-RAN (C-RAN), an Open-RAN (O-RAN), and/or another type of access network. Access network 105 may include a legacy RAN (e.g., a Third Generation (3G) RAN, a 4G or 4.5 RAN, etc.). Access network 105 may communicate with and/or include other types of access networks, such as, for example, a Wi-Fi network, a Worldwide Interoperability for Microwave Access (WiMAX) network, a local area network (LAN), a Citizens Broadband Radio System (CBRS) network, a cloud RAN, a virtualized RAN (vRAN), a self-organizing network (SON), a wired network (e.g., optical, cable, etc.), or another type of network that provides access to or can be used as an on-ramp to access network 105.

Access network 105 may include different and multiple functional splitting, such as options 1, 2, 3, 4, 5, 6, 7, or 8 that relate to combinations of access network 105 and core network 120 including an Evolved Packet Core (EPC) network and/or an NG core (NGC) network, or the splitting of the various layers (e.g., physical layer, media access control (MAC) layer, radio link control (RLC) layer, and packet data convergence protocol (PDCP) layer, etc.), plane splitting (e.g., user plane, control plane, etc.), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, NSA, standalone (SA), etc.), carrier aggregation (CA) (e.g., intra-band, inter-band, contiguous, non-contiguous, etc.), edge and core network slicing, coordinated multipoint (COMP), various duplex schemes (e.g., frequency division duplex (FDD), time division duplex (TDD), half-duplex FDD (H-FDD), etc.), and/or another type of connectivity service (e.g., NSA new radio (NR), SA NR, etc.).

According to some exemplary embodiments, access network 105 may be implemented to include various architectures of wireless service, such as, for example, macrocell, microcell, femtocell, picocell, metrocell, NR cell, Long Term Evolution (LTE) cell, non-cell, or another type of wireless architecture. Additionally, according to various exemplary embodiments, access network 105 may be implemented according to various wireless technologies (e.g., radio access technologies (RATs), etc.), and various wireless standards, frequencies, bands, and segments of radio spectrum (e.g., centimeter (cm) wave, millimeter (mm) wave, below 6 gigahertz (GHz), above 6 GHz, higher than mm wave, C-band, licensed radio spectrum, unlicensed radio spectrum, above mm wave), and/or other attributes or technologies used for radio communication. According to some exemplary embodiments, access network 105 may be implemented to include various wired and/or optical architectures for wired and/or optical access services.

Depending on the implementation, access network 105 may include one or multiple types of network devices, such as access devices 107. For example, access device 107 may include a next generation Node B (gNB), an enhanced Long Term Evolution (eLTE) evolved Node B (eNB), an eNB, a radio network controller (RNC), a radio intelligent controller (RIC), a base station controller (BSC), a remote radio head (RRH), a baseband unit (BBU), a radio unit (RU), a remote radio unit (RRU), a centralized unit (CU), a CU-control plane (CP), a CU-user plane (UP), a distributed unit (DU), a small cell node (e.g., a picocell device, a femtocell device, a microcell device, a home eNB, a home gNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a 7G wireless station, or another generation of wireless station), or another type of wireless node (e.g., a WiFi device, a WiMax device, a hotspot device, a fixed wireless access CPE (FWA CPE), etc.) that provides a wireless access service. Additionally, access devices 107 may include a wired and/or an optical device (e.g., modem, wired access point, optical access point, Ethernet device, multiplexer, etc.) that provides network access and/or transport service.

According to some exemplary implementations, access device 107 may include a combined functionality of multiple RATs (e.g., 4G and 5G functionality, 5G and 5.5G functionality, 5G and 6G), etc.) via soft and hard bonding based on demands and needs. According to some exemplary implementations, access device 107 may include a split access device (e.g., a CU-control plane (CP), a CU-user plane (UP), etc.) or an integrated functionality, such as a CU-CP and a CU-UP, or other integrations of split RAN nodes. Access device 107 may be an indoor device or an outdoor device.

External network 115 may include one or multiple networks of one or multiple types and technologies that provide an application service. For example, external network 115 may be implemented using one or multiple technologies including, for example, network function virtualization (NFV), SDN, cloud computing, Infrastructure-as-a-Service (IaaS), Platform-as-a-Service (PaaS), Software-as-a-Service (SaaS), or another type of network technology. External network 115 may be implemented to include a cloud network, a private network, a public network, a multi-access edge computing (MEC) network, a fog network, the Internet, a packet data network (PDN), a service provider network, the World Wide Web (WWW), an Internet Protocol Multimedia Subsystem (IMS) network, a Rich Communication Service (RCS) network, a software-defined (SD) network, a virtual network, a packet-switched network, a data center, a data network, or other type of application service layer network that may provide access to and may host an end device application service.

Depending on the implementation, external network 115 may include various network devices such as external devices 117. For example, external devices 117 may include virtual network devices (e.g., virtualized network functions (VNFs), servers, host devices, application functions (AFs), application servers (ASs), server capability servers (SCSs), containers, hypervisors, virtual machines (VMs), pods, network function virtualization infrastructure (NFVI), and/or other types of virtualization elements, layers, hardware resources, operating systems, engines, etc.) that may be associated with application services for use by end devices 130. By way of further example, external devices 117 may include mass storage devices, data center devices, NFV devices, SDN devices, cloud computing devices, platforms, and other types of network devices pertaining to various network-related functions (e.g., security, management, charging, billing, authentication, authorization, policy enforcement, development, etc.). Although not illustrated, external network 115 may include one or multiple types of core devices 122, as described herein.

External devices 117 may host one or multiple types of application services. For example, the application service may pertain to broadband services in dense areas (e.g., pervasive video, smart office, operator cloud services, video/photo sharing, etc.), broadband access everywhere (e.g., 50/100 Mbps, ultra-low-cost network, etc.), enhanced mobile broadband (eMBB), higher user mobility (e.g., high speed train, remote computing, moving hot spots, etc.), Internet of Things (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), massive machine-type communications (mMTC), voice, video calling, video conferencing, instant messaging), video streaming, fitness services, navigation services, and/or other types of wireless and/or wired application services. External devices 117 may also include other types of network devices that support the operation of external network 115 and the provisioning of application services, such as an orchestrator, an edge manager, an operations support system (OSS), a local domain name system (DNS), registries, and/or external devices 117 that may pertain to various network-related functions (e.g., security, management, charging, billing, authentication, authorization, policy enforcement, development, etc.). External devices 117 may include non-virtual, logical, and/or physical network devices.

According to an exemplary embodiment, at least some of external devices 117 may include logic of the device status intelligence function service. For example, an AS, a MEC server, an IP server, a cloud server, an Internet or Web server, a data network server, an application network device, a similar network device that may host an application service (also referred to simply as an AS), or another type of external device 117 (e.g., a management device associated with a farm or cluster of ASs, etc.) may provide an exemplary embodiment of the device status intelligence function service, as described herein.

Core network 120 may include one or multiple networks of one or multiple network types and technologies. Core network 120 may include a complementary network of access network 105. For example, core network 120 may be implemented to include a 5G core network, an EPC of an LTE network, an LTE-Advanced (LTE-A) network, and/or an LTE-A Pro network, a future generation core network (e.g., a 5.5G, a 6G, a 7G, or another generation of core network), and/or another type of core network.

Depending on the implementation of core network 120, core network 120 may include diverse types of network devices that are illustrated in FIG. 1 as core devices 122. For example, core devices 122 may include a user plane function (UPF), a Non-3GPP Interworking Function (N3IWF), an access and mobility management function (AMF), a session management function (SMF), a unified data management (UDM), a unified data repository (UDR), an authentication server function (AUSF), a security anchor function (SEAF), a network exposure function (NEF), a network slice selection function (NSSF), a network repository function (NRF), a policy control function (PCF), a network data analytics function (NWDAF), a service capability exposure function (SCEF), a lifecycle management (LCM) device, a mobility management entity (MME), a packet data network (PDN) gateway (PGW), an enhanced packet data gateway (ePDG), a serving gateway (SGW), a home agent (HA), a General Packet Radio Service (GPRS) support node (GGSN), an HSS, an authentication, authorization, and accounting (AAA) server, a policy and charging rules function (PCRF), a policy and charging enforcement function (PCEF), and/or a charging system (CS).

According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), and/or other combined nodes (e.g., an HSS with a UDM and/or UDR, an MME with an AMF, etc.). Also, core devices 122 may include a split core device 122. For example, core devices 122 may include a session management (SM) PCF, an access management (AM) PCF, a user equipment (UE) PCF, and/or another type of split architecture associated with another core device 122, as described herein.

According to an exemplary embodiment, at least some of core devices 122 may include logic of the device status intelligence function service. For example, a DSIF may provide an exemplary embodiment of the device status intelligence function service, as described herein. The DSIF may include functional elements that provide sub-services of the device status intelligence function service. For example, the DSIF may include a storage device that may store end device profile information, a policy device that may store and create policies relating to an application and end device 130, as described herein. The DSIF may include a controller or management device that may dynamically generate communication profiles for obtaining information from other network devices and systems of relevance to the policies associated with the application and end device 130. The DISF may also include a collection and a notification device(s) that may subscribe to notifications pertaining to policy violations and other policy-related states or events associated with the application and end device 130, as well as providing such notifications to the subscribing device. For example, the subscribing device may be implemented as an AS or the like, which may host the application of relevance to which end device 130 may use or access. The DSIF is described further herein.

End device 130 may include a device that may have communication capabilities (e.g., wireless, wired, optical, etc.). End device 130 may or may not have computational capabilities. End device 130 may be implemented as a mobile device, a portable device, a stationary device (e.g., a non-mobile device and/or a non-portable device), a device operated by a user, or a device not operated by a user. For example, end device 130 may be implemented as a smartphone, a mobile phone, a personal digital assistant, a tablet, a netbook, a wearable device (e.g., a watch, glasses, headgear, a band, etc.), a computer, a gaming device, a television, a set top box, a music device, an IoT device, a drone, a smart device, a fixed wireless device, a router, a sensor, an automated guided vehicle (AGV), an industrial robot, or other type of wireless device (e.g., other type of user equipment (UE)). End device 130 may be configured to execute various types of software (e.g., applications, programs, etc.). The number and the types of software may vary among end devices 130. End device 130 may include "edge-aware" and/or "edge-unaware" application service clients. For purposes of description, end device 130 is not considered a network device. End device 130 may be implemented as a virtualized device in whole or in part.

According to some exemplary embodiments of device status intelligence function service, the device status intelligence function service may relate to end devices 130 that may not include operating systems, specific purpose devices (e.g., cameras or the like), and/or end devices 130 that may not be operated by users (e.g., a smart device, an IoT device, a sensor device, etc.). According to other exemplary embodiments of device status intelligence function service, the device status intelligence function service may relate to any type of end device 130 or a different subset of end devices 130, as described.

Figure 2:
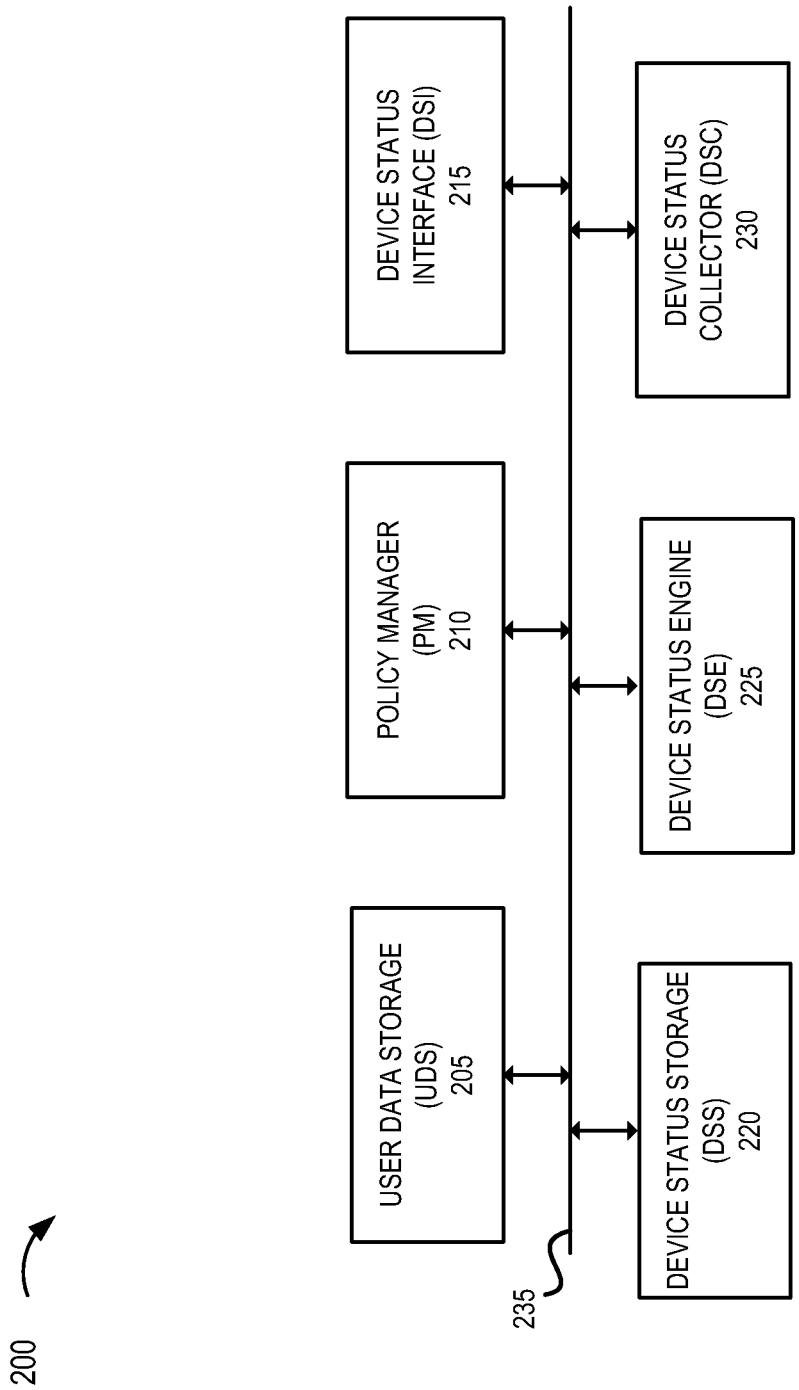
FIG. 2 is a diagram illustrating exemplary components of a network device that provide an exemplary embodiment of the device status intelligence function service.

FIG. 2 is a diagram of exemplary components of a network device 200 that may provide an exemplary embodiment of the device status intelligence function service. As illustrated, network device 200 may include a user data storage (UDS) 205, a policy manager (PM) 210, a device status interface (DSI) 215, a device status storage (DSS) 220, a controller or device status engine (DSE) 225, and a device status collector (DSC) 230, and a communication link 235. The number, type, and arrangement of components and links are exemplary.

Communication link 235 may include a hardware link (e.g., a bus, a shared memory space, etc.), a software link (e.g., inter-process communication (IPC) or the like), an application programming interface (API), or some other type of communicative link (e.g., a wired connection, an optical connection, a wireless connection, etc.). Communication link 235 may enable communication between one or multiple other components of network device 200. For example, device status engine 225 may communicate with other components, such as device status interface 215, device status storage 220, and device status collector 230 via communication link 235. Additionally, for example, other components of network device 200 may communicate with each other via communication link 235, such as device status interface 215 and device status storage 220, and so forth.

User data storage 205 may include a repository or storage device that stores end device profile information and application profile information. For example, the end device profile information may include one or multiple identifiers pertaining to end devices 130. For example, the identifier may be implemented to include International Mobile Subscriber Identities (IMSIs), Subscription Permanent Identifiers (SUPIs), International Mobile Equipment Identities (IMEIs), Mobile Directory Numbers (MDNs), Permanent Equipment Identifiers (PEIs), and/or the like. The end device profile information may include other identifiers, such as card identifiers (e.g., Integrated Circuit Card Identifiers (ICCIDs), subscriber identification module (SIM) card identifiers, eSIM identifiers, etc.), network access identifiers (NAIs), Mobile Equipment Identifiers (MEIDs), Media Access Control (MAC) addresses, Internet Protocol (IP) addresses, and/or another type of string that may (uniquely) identify end device 130, a component of end device 130 (e.g., a circuit board, a card, or other form of hardware and/or software), and/or a user associated with end device 130.

The end device profile information may include other information pertaining to attributes or characteristics of end device 130, such as the make, brand, and/or model of end device 130, type and/or form factor of end device 130 (e.g., mobile phone, tablet, camera, video camera, sensor, IoT, operated by a user, not operated by a user, etc.), operating system (OS) and version, wireless capabilities (e.g., network frequencies and/or frequency bands supported), and/or radio access technologies (RATs) supported (e.g., 4G, 5G, 4G+5G, 6G, etc.).

The application profile information may include an identifier of an application. For example, the identifier may be a unique string (e.g., numerical, alphanumeric, etc.) that identifies the application. The application profile information may include other attribute and/or characteristics information pertaining to the application. For example, the attribute information may indicate a category of the application (e.g., real-time, extreme real-time, ultra-reliability, video streaming, industrial, medical, etc.) and/or minimum requirements pertaining to quality of service (QOS) and/or other performance metrics (e.g., key performance indicator (KPI), quality of experience (QoE), mean opinion score (MOS), or the like), which may relate to bandwidth, packet error rate, latency, throughput, bit rate (e.g., guaranteed, minimum, maximum, aggregate, etc.), round trip time, a 5G QoS Identifier (5QI) value, data burst volume, application availability, and/or the like.

According to an exemplary embodiment, user data storage 205 may store the end device profile information of end device 130 and the application profile information of the application such that the information is correlated or mapped to one another. User data storage 205 may further include a device that includes logic of the device status intelligence function service, as described herein.

Policy manager 210 may include a device that provides a policy service of the device status intelligence function service. Policy manager 210 may generate one or multiple policies based on one or multiple application requirements associated with an application of an application network device (e.g., AS, MEC server, Web server, cloud server, fog server, data network server, etc.) that may use or subscribe to the device status intelligence function service. For example, policy manager 210 may evaluate and apply the application requirement to the network (e.g., access network 105, core network 120, etc.), identify applicable network data for monitoring the adherence of the application requirement, and determine an action to be taken when an event (e.g., a violation or another type of event) occurs. As an example, assume an application requirement indicates a maximum of about 30 milliseconds (ms) for latency between end device 130 and the application network device, such as a MEC server. Policy manager 210 may decompose the application requirement. For example, policy manager 210 may identify network data or conditions that provide an evaluation of latencies along a communication path between end device 130 and the application network device, such an allowable latency between end device 130 and access device 107, as well as an allowable latency between access device 107 and the MEC server.

Policy manager 210 may identify other types of network data that may contribute to the evaluation of latency, such as the geographic location of end device 130, aspects of access device 107 (e.g., RAT, frequency band, etc.), data speeds (e.g., upload, download) associated with end device 130, and so forth. Additionally, policy manager 210 may generate action data relating to the action to be taken when an underlying condition of the policy (e.g., a maximum of about 30 ms) is not met and/or when the condition is met. For example, the policy manager 210 may generate action data pertaining to a notification to the MEC server, such as whether to send a notification, how often, the data included in the notification, and so forth. According to some exemplary embodiments, an application requirement may be a pre-configured application requirement from which the application network device may select (e.g., from a list of application requirements that are supported) for monitoring and notification services. As an example, network quality (e.g., signal strength) may be a supported application requirement in which the application network device may specify a value (e.g., a threshold value) related to signal strength. According to some exemplary embodiments, an application requirement may be a customized or non-pre-configured application requirement from which the application network device may request for monitoring and notifications.

According to an exemplary embodiment, the application network device may provide policy manager 210 with the application requirements of relevance for monitoring and notifications, as described herein. According to various exemplary embodiments, the application requirements may specify criteria, threshold values, and/or other factors that may pertain to end device 130 and a use case. For example, the application requirements may relate to network quality (e.g., signal strength (e.g., signal-to-noise ratio (SINR) value or range, Reference Signal Received Power (RSRP) value or range, Reference Signal Received Quality (RSRQ) value or range, channel state information (CSI), and/or other values that may be included in a measurement report from end device 130 in relation to uplink and/or downlink wireless connection), type of network (e.g., 3G, 4G, 5G, and beyond)); end device profile information (e.g., brand, model, OS and version, supported network frequencies and bands, etc.); data usage (e.g., total data used in a current billing cycle, data usage broken down by application (without revealing the application names), current data speed (e.g., upload and download); end device connectivity (e.g., RAT type, data roaming status, device reachability); location-based data (e.g., access device 107 identifier to which end device 130 is connected, general geographic area (e.g., city, region, town, district, etc.), type of location of end device 130 (e.g., indoors, outdoors, underground, etc.); service status (e.g., active subscriptive type (e.g., prepaid, postpaid), expiry date of a current subscription of end device 130, available balance (e.g., for prepaid users); end device 130 activities (e.g., uptime (e.g., time since the end device 130 was last restarted), list of supported features (e.g., VOLTE, Wi-Fi calling, etc.), active versus idle status); roaming information (e.g., end device 130 is roaming or not roaming), roaming partner's network and quality), and/or other types of configurable application requirements (e.g., performance or QoS metric parameters and values pertaining to throughput, latency, reliability, packet error rate, bit rate (e.g., guaranteed, minimum, maximum, aggregate, etc.), maximum data burst volume, priority level (e.g., class of service (CoS), differentiated service code point (DSCP), etc.), and the like, as described herein.

Device status interface 215 may include a device that receives and responds to queries from an application network device (e.g., AS, MEC server, Web server, cloud server, etc.) that may use the device status intelligence function service. For example, in response to receiving a query regarding a current status pertaining to end device 130 and associated policies pertaining to an application, device status interface 215 may determine whether there is a policy violation, as described herein. Device status interface 215 may provide the application network device with the current status (e.g., no violation or the presence of a violation). Device status interface 215 may also forward notifications to the application network device based on the monitoring of compliance with the policies associated with end device 130 and the application, and detection of policy violations in a network (e.g., access network 105, core network 120, external network 115, etc.).

Device status storage 220 may include a repository or storage device that stores information pertaining to the device status intelligence function service, as described herein. For example, device status storage 220 may store queries from an application network device (e.g., AS, MEC server, Web server, cloud server, etc.) that may use the device status intelligence function service. Additionally, device status storage 220 may store responses to queries, notifications, and/or other types of information related to messages or communications between components of network device 200 and/or devices external from network device 200.

Device status engine 225 may include a device that may manage, control, and/or coordinate the device status intelligence function service and associated sub-services, as described herein. Device status engine 225 may obtain policies from policy manager 210 and end device profile information from user data storage 205 that pertain to an application and an application network device, as described herein. Device status engine 225 may dynamically generate communication profiles for obtaining information from other network devices and systems of relevance to the policies (e.g., policy-related network data) associated with the application requirement and end device 130. For example, device status engine 225 may identify which access device 107, core device 122, and/or external device 117 to communicate with (e.g., based on type of the network device, function associated the network device, information stored by and/or collected by the network device based on type and/or function, etc.) to obtain policy-related network data and/or application requirement data. The communication profile may include network addresses and other types of communication information (e.g., protocols, network interfaces, type of network device by function (e.g., HSS versus AMF), type of network device by generation (e.g., 4G versus 5G), etc.) to enable communication with the identified network devices, and register a subscription with the network device for event monitoring and notification services. Device status engine 225 may determine or identify the type of data to request for monitoring, collection, and notification.

According to an exemplary embodiment, device status engine 225 may generate a collection procedure that may be used by device status collector 230 to collect data. For example, the collection procedure may include the creation of a subscription with the network device (e.g., access device 107, external device 117, core device 122, X-haul device, etc.) for monitoring and collecting policy-related network data and/or application requirement data, and providing notifications (e.g., status updates) regarding current policy-related network data and/or application requirement data. The collection procedure may provide messages that may be used by device status collector 230 to poll or check the network device for relevant information relating to the application requirement and/or policy.

Device status engine 225 may receive notifications of events from device status collector 230. Device status engine 225 may determine whether a policy violation or other type of event, as described herein, has occurred based on the monitored and/or collected data received in the notifications. Device status engine 225 may also determine the appropriate action when an event occurs based on the policies, as described herein. For example, device status engine 225 may determine whether or not to provide an application network device with the notification.

Device status collector 230 may include a device that provides a collection service that may include registering, monitoring, and notification services, as described herein, of the device status intelligence function service. For example, device status collector 230 obtains data indicative of the criteria associated with the policies, the application requirements, end devices 130, and the application. Device status collector 230 may register with other network devices that may monitor and notify device status collector 230 when requested information associated with the policy and/or application requirement is available, as described herein. For example, device status collector 230 may establish an event monitoring and notification subscription with other network devices based on the communication profile, as described herein. As an example, device status collector 230 may register with a NEF, a RIC, an NWDAF, an HSS, a UDM/UDR, a gNB, an MME, an SMF, an AMF, and/or another type of access device 107, external device 117, and/or core device 122, as described herein. Device status collector 230 may be implemented as a distributive system that may reside in access network 105, external network 115, and core network 120. Device status collector 230 may report device status notifications and/or other types of events, as described herein, to device status engine 225.

According to some exemplary embodiments, device status collector 230 may register with the other network devices that may monitor and notify device status collector 230 for other types of events. As an example, the events may relate to when end device 130 attaches to access network 105, attaches and/or registers with core network 120, when end device 130 detaches, de-registers, and/or is in a particular network state (e.g., idle, sleep, active, roaming, non-roaming, etc.), when end device 130 may transition from being in a policy violated state to a policy compliant state, and/or other configurable events that may relate to the monitored policies, as described herein.

FIG. 2 illustrates exemplary components that may provide an exemplary embodiment of the device status intelligence function service, however according to other exemplary embodiments, additional, fewer, and/or different components may be implemented. For example, a single component/device may be implemented as multiple components/devices and/or multiple components/devices may be implemented as a single component/device.

Figure 3A:
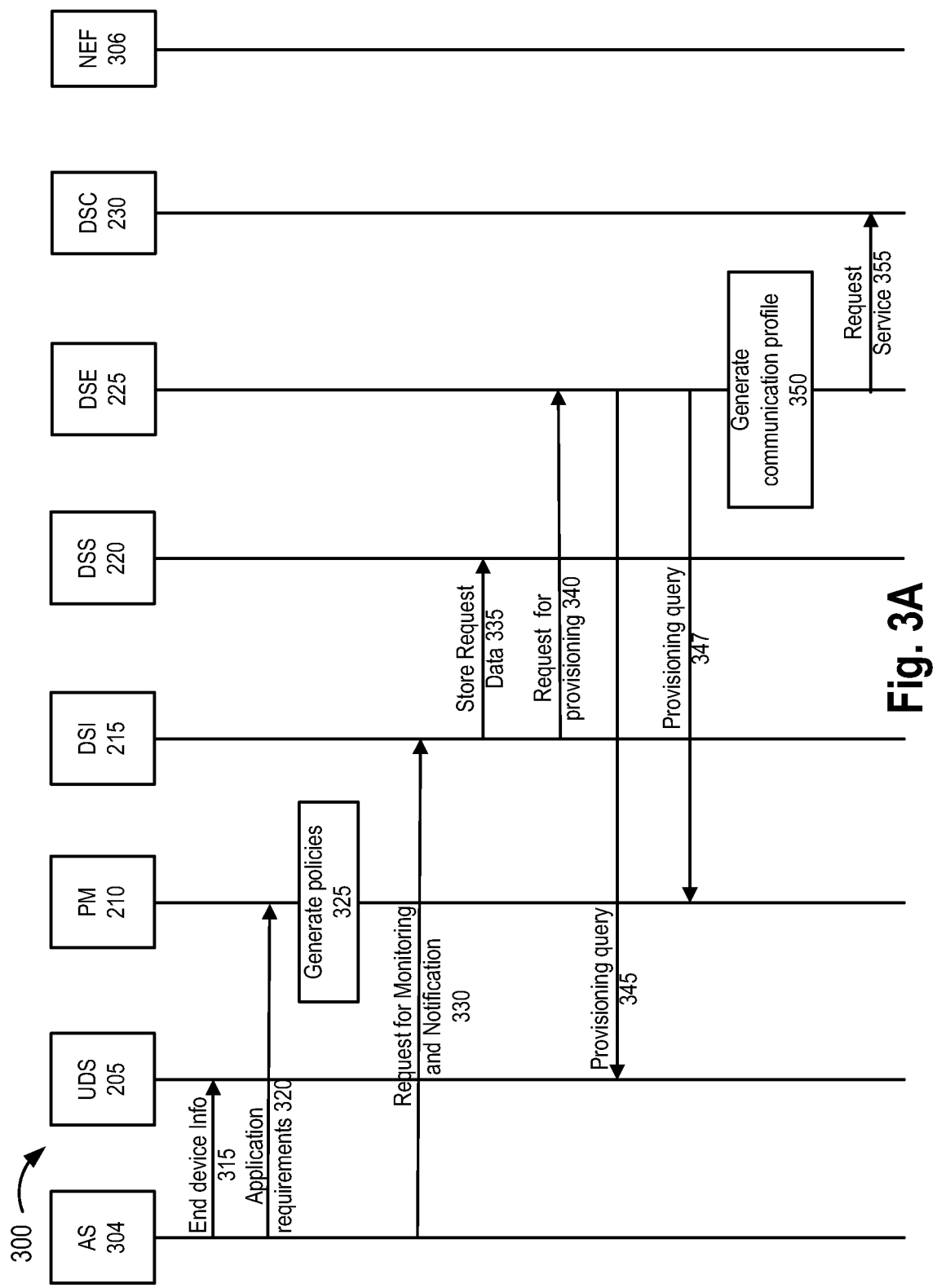
FIGS. 3A and 3B are diagrams illustrating an exemplary communication flow of an exemplary embodiment of the device status intelligence function service according to an exemplary scenario.
Figure 3B:
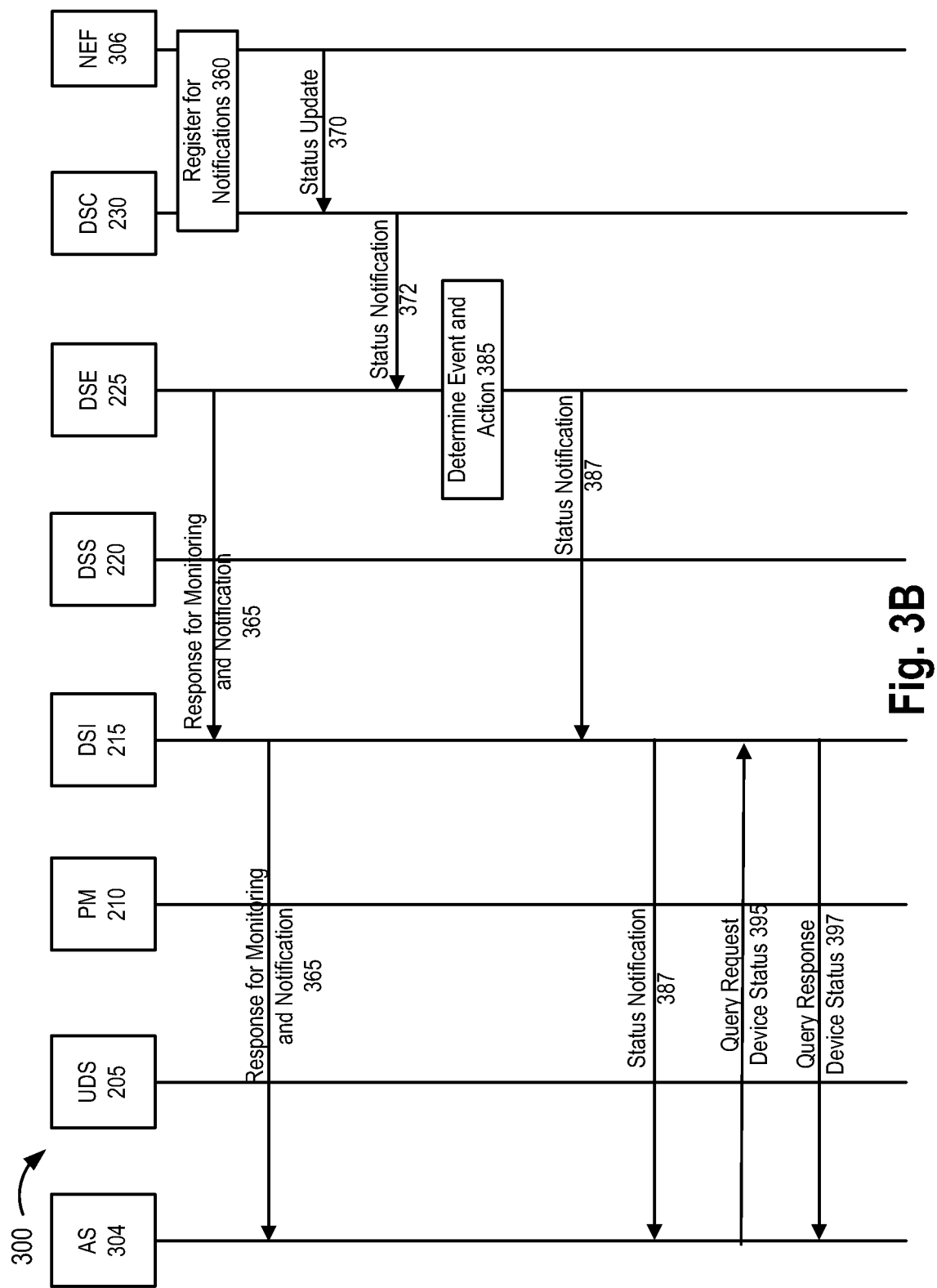

FIGS. 3A and 3B are diagrams illustrating an exemplary communication flow or process 300 of an exemplary embodiment of the device status intelligence function service according to an exemplary scenario. As illustrated, an exemplary environment may include an application server (AS) 304, user data storage 205, policy manager 210, device status interface 215, device status storage 220, device status engine 225, device status collector 230, and a NEF 306. Application server 304 is an exemplary implementation of external device 117. User data storage 205, policy manager 210, device status interface 215, device status storage 220, device status engine 225, device status collector 230, and NEF 306 are exemplary implementations of core devices 122. As previously described, device status collector 230 may be implemented as a disbursed system in which multiple device status collectors 230 may reside in a network other than core network 120 (e.g., access network 105, external network 115, etc.).

Application server 304 may host an application service that may be used by end device 130. For example, the application service may be an application service described in relation to external device 117. According to various exemplary embodiments, application server 304 may be associated with a network operator or similar entity associated with access network 105, core network 120, and/or external network 115, or may be associated with a third party relative to the network operator or similar entity.

According to an exemplary embodiment, prior to the execution of process 300, application server 304 may obtain the end device profile information from the users of end devices 130 or end devices 130 of relevance. According to another exemplary embodiment, a network operator, a service provider, and/or another type of third party entity (e.g., associated with access network 105, core network 120, etc.) may obtain the end device profile information relating to the users of end devices 130 or end devices 130 on behalf of an entity associated with AS 305.

Referring to FIG. 3A, application server 304 may generate and transmit a message 315 that includes end device information to user data storage 205. For example, the end device information may include an identifier of end device 130, as described herein. Message 315 may include application data. For example, the application data may include an identifier of the application to which application server 304 may be hosting and end device 130 may access and use. Application server 304 may generate and transmit a message 320 that includes application requirements of the application. For example, the application requirements may include one or multiple application requirements, such as those related to network quality, data usage, device connectivity, and/or other types of end device criteria data, as described herein. According to various exemplary embodiments, the application requirement may relate to a pre-configured application requirement or a customized application requirement. According to some exemplary embodiments, message 320 may include data regarding requested actions. For example, message 320 may include action data which may indicate an event notification method (e.g., periodic, one time, on event detection, etc.), maximum number of notifications, monitoring duration, repetition period, immediate reporting indication, and/or other parameters relating to the notification service. According to some exemplary embodiments, the action data may include a pre-configured action parameter from which the application network device (e.g., application server 304) may select (e.g., from a list of action parameters that are supported) for monitoring and notification services. As an example, a maximum number of notifications may be a supported action parameter in which the application network device may specify a value (e.g., an integer value indicating the maximum number) for providing notifications regarding a particular event or events. According to some exemplary embodiments, an action parameter may be a customized or a non-preconfigured action parameter for which the application network device may request regarding actions taken, such as notifications.

In response to receiving, reading, and analyzing message 320, policy manager 210 may generate policies 325 pertaining to the application and the application requirement(s) associated with end devices 130, as described herein. For example, policy manager 210 may store the application requirement, evaluate the application requirement, identify underlying criteria of or indicative of the application requirement in relation to networks devices of a network (e.g., access network 105, access devices 107, core network 120, core devices 122, etc.), end device 130, network information (e.g., roaming, data usage, location, etc.), and the like. Policy manager 210 may generate policies based on the such analytics as well as actions performed when events occur, which may include policy-related network data and action data, as described herein. Policy manager 210 may store the policies and correlate the policies with other information, such as the application requirements and other relevant information (e.g., end device identifiers, etc.).

Application server 304 and device status interface 215 may perform a subscription for monitoring and notification procedure. For example, as illustrated, application server 304 may generate and transmit a request 330 to establish and/or register with the monitoring and notification services of the device status intelligence function service. Request 330 may include identifiers of end devices 130 to which the monitoring and notification services pertain and the application identifier that identifies the application associated with application server 304. The request may further include a uniform resource identifier (URI) indicating where to receive notifications. In response, device status interface 215 may store the request data 335 with device status storage 220. Additionally, device status interface 215 may generate and transmit a request for provisioning message 340 to device status engine 225. For example, request 340 may include the identifiers of end devices 130, the application identifier, and data indicating a request to provision the monitoring and notification services.

In response to receiving and reading request 340, device status engine 225 may obtain additional end device profile information (e.g., beyond identifier of end device 130) from user data storage 205 via a provisioning query 345. For example, query 345 may include the end device identifier and the application identifier. Additionally, or alternatively, in response to receiving and reading request 340, device status engine 225 may obtain the policies or the policies and the application requirements from policy manager 210 via a provisioning query 347. Query 347 may include the end device identifier and the application identifier, which may be correlated or mapped to the policies and the application requirements of relevance, for example.

As further illustrated, device status engine 225 may generate a communication profile 350, as described herein. For example, device status engine 225 may identify which network devices (e.g., access device 107, core device 122, etc.) to communicate with to obtain information indicative of the application requirement and/or underlying criteria or indicators for determining whether the policy is satisfied or an event has or has not occurred, indicate the type of data to request for monitoring, and provide a collection procedure that may be used by device status collector 230 and the network device of relevance. In response to the generation of the communication profile, device status engine 225 may generate and transmit a request for service 355 to device status collector 230. For example, request 355 may include a request to create a subscription with the network device (e.g., access device 107, external device 117, core device 122, etc.) for provisioning the monitoring and notifications (e.g., status updates). Request 355 may include the policy-related network data and/or criteria, application requirements, end device identifier, and the like to monitor, and other relevant information relating to the application requirement/policy. Request 355 may include the communication profile.

Referring to FIG. 3B, in response to receiving request 355, device status collector 230 may register for notifications 360. For example, according to this example, device status collector 230 may register or establish an event monitoring and notification subscription with one or multiple network devices, such as NEF 306 and/or other network devices (not illustrated) based on the communication profile. Additionally, based on the provisioning procedure, device status engine 225 may generate and transmit a response 365 for monitoring notification to device status interface 215. For example, response 365 may include data indicating that the requested monitoring and notification service has been created. Device status interface 215 may forward response 365 to application server 304, which is responsive to request 330 illustrated in FIG. 3A. Although not shown, device status engine 225 may store communication profile information in device status storage 220.

Based on the subscription or registration with a network device associated with the notification service, device status collector 230 may receive a status update 370 from NEF 306 (or another network device via NEF 306). Status update 370 may relate to an event (e.g., a policy violation or another type of event, as described herein) or a non-event (e.g., current status pertaining to monitored data of relevance) and end device 130. In response to receiving status update 370, device status collector 230 may generate and transmit a status notification 372, which may include information of status update 370, to device status engine 225. In response to receiving status notification 372, device status engine 225 may determine an event and action 385. For example, device status engine 225 may evaluate the collected data included in status notification 372, and determine whether a policy violation or another type of event has occurred, and if so, to determine the proper action to take based on corresponding parameters pertaining to the action data and associated event. According to this example, device status engine 225 may determine that a notification is to be sent to application server 304. In response to the determination, device status engine 225 may generate and transmit a status notification 387 that provides a device status regarding the policy and/or the application requirement of relevance. For example, status notification 387 may include information included in status update 370, such as current values or data associated with an application requirement, timestamp information relating to the event, and so forth. In response to receiving status notification 387, device status interface 215 may forward status notification 387 to AS 304.

As further illustrated, application server 304 may generate and transmit a query for device status message 395 to device status interface 215 regarding the device status of end device 130. For example, application server 305 may query, in an ad hoc manner, current status relating to end device 130. As an example, message 395 may include an identifier of end device 130, an identifier of the application, and a request or query for latest event information, whether end device 130 is in a policy compliant or violation state, and/or another type of query related to end device 130, an application requirement status, and so forth. Device status interface 215 may generate a query response 397 based on information stored in device status storage 220, for example.

According to various exemplary scenarios, application server 304 may receive a notification or perform a query from device status interface 215 before an application service session is established with end device 130, as a part of an establishment of an application service session with end device 130, or during an active application service session with end device 130. Depending on the circumstances or context, application server 304 may apply the device status or event information to an operation or network procedure. For example, application server 304 may use the notification or event information to establish an application session with end device 130 and/or to communicate with core device 122 to obtain policy information applicable to end device 130. According to another example, during an active application session, application server 304 may use the notification or event information to modify or maintain a QoS metric or a QoS Class identifier (QCI) value associated with an application session. According to yet another example, application server 304 may invoke a termination of an active application session when end device 130 may be in non-compliance with a policy of the application requirement. Alternatively, application server 304 may inform end device 130 of the non-compliance, provide a recommendation to satisfy the policy, and/or the like before invoking the termination. According to still another example, when the notification or event information indicates that end device 130 is absent or not connected to a network (e.g., a core network), application server 304 may trigger a timer and wait a period of time before initiating another query and/or may store the inactivity information as historical information pertaining to end device 130 and its associated availability, connectivity to a network, application usage, and the like.

FIGS. 3A and 3B illustrate an exemplary communication flow or process 300 of the device status intelligence function service, however, according to other exemplary embodiments, the device status intelligence function service may perform additional operations, fewer operations, and/or different operations than those illustrated and described in relation to FIGS. 3A and 3B. For example, additional messages may be generated and transmitted to execute a step of process 300, which may have been omitted for the sake of brevity.

FIG. 4 is a diagram illustrating exemplary components of a device 400 that may be included in one or more of the devices described herein. For example, device 400 may correspond to access device 107, external device 117, core device 122, end device 130, network device 200, the DSIF, and/or other types of devices, as described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation, or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, learning, model-based, etc.

Memory/storage 415 includes one or multiple memories and/or one or multiple other types of storage mediums. For example, memory/storage 415 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 415 may be external to and/or removable from device 400, such as, for example, a Universal Serial Bus (USB) memory stick, a dongle, a hard disk, mass storage, off-line storage, or some other type of storing medium. Memory/storage 415 may store data, software, and/or instructions related to the operation of device 400.

Software 420 includes an application or a program that provides a function and/or a process. As an example, with reference to core device 122 (e.g., network device 200, the DSIF, etc.), software 420 may include an application that, when executed by processor 410, provides a function and/or a process of the device status intelligence function service, as described herein. Software 420 may also include firmware, middleware, microcode, hardware description language (HDL), and/or another form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces, optical interfaces, and/or wired interfaces. For example, communication interface 425 may include one or multiple transmitters and receivers, or transceivers. Communication interface 425 may operate according to a protocol stack and a communication standard.

Input 430 permits an input into device 400. For example, input 430 may include a keyboard, a mouse, a display, a touchscreen, a touchless screen, a button, a switch, an input port, speech recognition logic, and/or some other type of visual, auditory, tactile, affective, olfactory, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, PaaS, etc.). Device 400 may be implemented in the same manner. For example, device 400 may be instantiated, created, deleted, or some other operational state during its life-cycle (e.g., refreshed, paused, suspended, rebooted, or another type of state or status), using well-known virtualization technologies. For example, access device 107, core device 122, external device 117, and/or another type of network device or end device 130, as described herein, may be a virtualized device.

Device 400 may be configured to perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a function, an operation, or a process described herein. Alternatively, for example, according to other implementations, device 400 may be configured to perform a function, an operation, or a process described herein based on the execution of hardware (processor 410, etc.).

Figure 5:
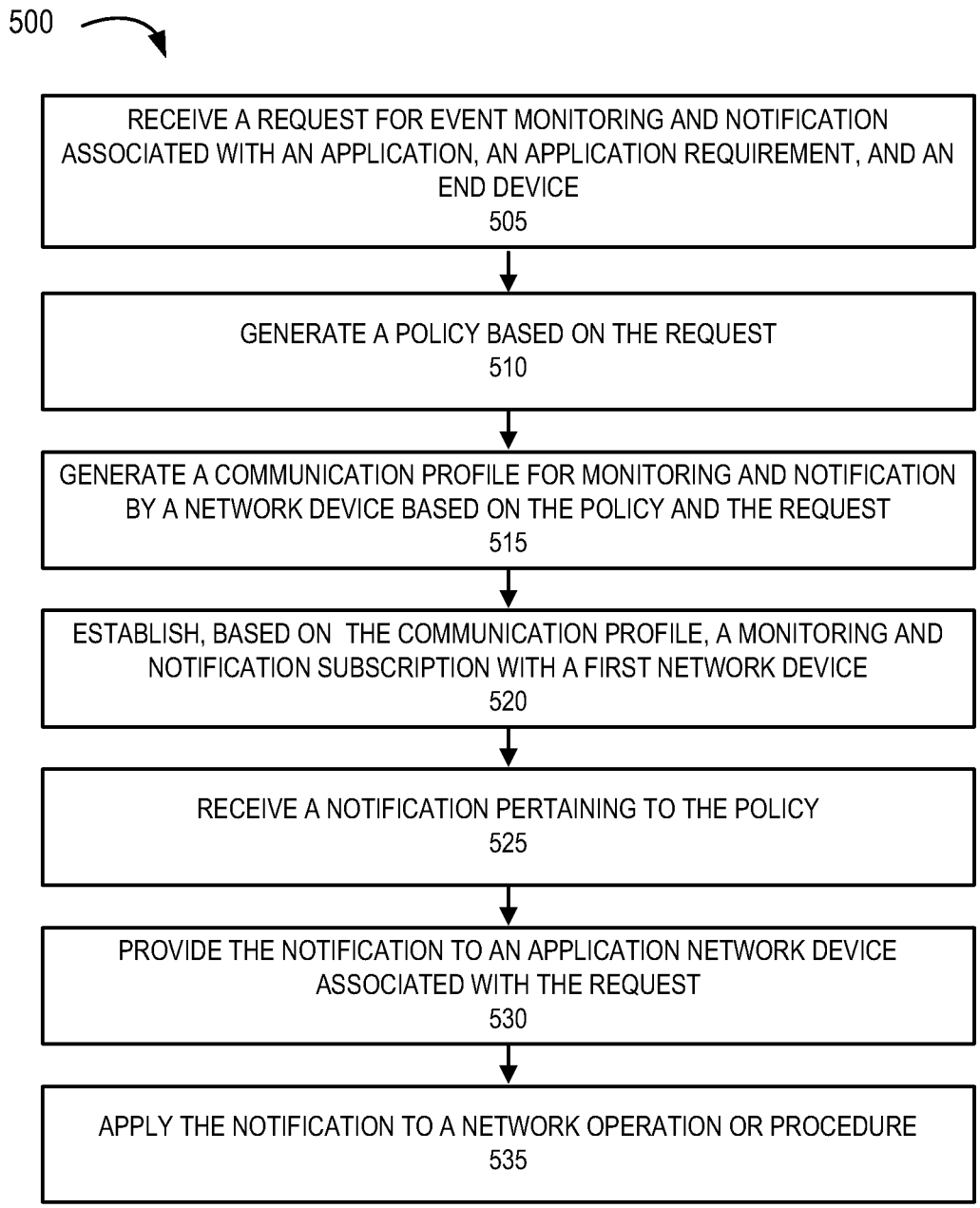
FIG. 5 is a diagram illustrating an exemplary process of an exemplary embodiment of the device status intelligence function service.

FIG. 5 is a flow diagram illustrating an exemplary process 500 of an exemplary embodiment of the device status intelligence function service. According to an exemplary embodiment, core device 122, such as network device 200 may perform operations of process 500. For example, network device 200, such as the DSIF may perform operations or steps of process 500. According to an exemplary implementation, processor 410 executes software 420 to perform a step (in whole or in part) of process 500, as described herein. Alternatively, a step (in whole or in part) may be performed by execution of only hardware. For purposes of description only, at least some of the operations of process 500 are described as being performed by the DSIF, such as network 200, without reference to a component of network 200. Process 500 may include an operation illustrated and described in relation to FIGS. 3A and 3B, and elsewhere in this description.

In block 505, network device 200 may receive a request for event monitoring and notification associated with an application, an application requirement, and end device 130, as described herein. For example, application server 304 may generate and transmit a request 330 to network device 200. Request 330 may include an end device identifier and an application identifier of the application associated with application server 304, as described herein.

In block 510, network device 200 may generate a policy based on the request, as described herein. For example, network device 200 may generate policies based on an application requirement obtained from application server 304. Network device 200 may evaluate the application requirement, identify underlying criteria of or indicative of the application requirement in relation to networks devices of a network, end device information, network information, and the like, and generate the policy based on such evaluation. For example, the policy may include policy-related network data and/or application requirement data, and action data, as described herein.

In block 515, network device 200 may generate a communication profile for monitoring and notification by a network device based on the policy and the request, as described herein. For example, network device 200 may identify a network device (e.g., access device 107, core device 122, etc.) to communicate with to obtain information indicative of the application requirement and/or policy-related network data, criteria, or indicators for determining whether the policy is satisfied or an event has or has not occurred, indicate the type of data to request for monitoring, and provide a collection procedure that may be used by to obtain the information and receive notifications of relevance from the network device, as described herein.

In block 520, network device 200 may register for monitoring and notification with a first network device based on the communication profile. For example, network device 200 may establish a subscription or a registration with the first network device to monitor policy-related network data, application requirement data, and the like and provide notifications to network device 200, as described herein.

In block 525, network device 200 may receive a notification pertaining to the policy, as described herein. For example, network device 200 may receive a status notification relating to the policy from the first network device, as described herein.

In block 530, network device 200 may provide the notification to an application network device associated with the request, as described herein. For example, network device 200 may determine whether an event has occurred and determine an action associated with the policy based on the status notification, as described herein. According to this exemplary scenario, network device 200 may determine to forward or transmit a notification to the application network device regarding the event or policy and end device 130.

In block 535, an application network device (e.g., application server 304 or the like) may apply the notification to a network operation or procedure, as described herein. For example, the application network device may initiate an application session with end device 130, modify an existing application session with end device, terminate an application session with end device 130, provide a recommendation to end device 130 during the application session, and so forth, as described herein.

FIG. 5 illustrates an exemplary process 500 of the device status intelligence function service, however, according to other exemplary embodiments, the device status intelligence function service may perform additional operations, fewer operations, and/or different operations than those illustrated and described in relation to FIG. 5.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks have been described regarding the process illustrated in FIG. 5, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, diverse types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to the consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
   receiving, by a network device from an application network device, a request for event monitoring and notification associated with an application, which is hosted by the application network device, an application requirement of the application network device, and an end device;
   generating, by the network device based on the request, a policy that includes policy-related network data and action data;
   generating, by the network device based on the policy and the request, a communication profile that includes the policy-related network data associated with a network subject to the event monitoring and notification, data indicating one or more first network devices to perform the event monitoring and notification, and a collection procedure that enables establishment of the event monitoring and notification with the one or more first network devices;
   establishing, by the network device based on the communication profile, one or more event monitoring and notification subscriptions with the one or more first network devices;
   receiving, by the network device from the one or more first network devices, a notification pertaining to the policy and the end device; and
   transmitting, by the network device to the application network device, the notification.

2. The method of claim 1, wherein the generating of the policy comprises:
   identifying, by the network device, criteria for monitoring an adherence to the application requirement in the network; and
   determining, by the network device, an action to perform when a violation of the application requirement occurs.

3. The method of claim 1, wherein the generating of the communication profile comprises:
   identifying, by the network device from multiple types of radio access devices of a radio access network and multiple types of core devices associated with a core network and based on the policy, a type of network device to perform the event monitoring and notification; and
   selecting, based on the identifying, at least one of the one or more first network devices.

4. The method of claim 1, further comprising:
   determining, by the network device based on the notification, whether the policy is violated.

5. The method of claim 1, wherein the application requirement may include one or more of the following:
   brand and model of the end device;
   location data associated with the end device;
   uptime associated with the end device;
   network state associated with the end device; and
   type of network subscription.

6. The method of claim 1, wherein the one or more first network devices include a radio access network device, a core network device, or both.

7. The method of claim 1, further comprises:
   applying the notification to perform a network operation.

8. The method of claim 7, wherein the network operation pertains to an establishment of an application session between the application network device and the end device, or a modification of an active application session between the application network device and the end device.

9. A system comprising:
   a network device comprising:
   a communication interface; and
   a first processor, wherein the first processor is configured to:
   receive, from an application network device, a request for event monitoring and notification associated with an application, which is hosted by the application network device, an application requirement of the application network device, and an end device;
   generate, based on the request, a policy that includes policy-related network data and action data;
   generate, based on the policy and the request, a communication profile that includes the policy-related network data associated with a network subject to the event monitoring and notification, data indicating one or more first network devices to perform the event monitoring and notification, and a collection procedure that enables establishment of the event monitoring and notification with the one or more first network devices;
   establish, based on the communication profile, one or more event monitoring and notification subscriptions with the one or more first network devices;
   receive, from the one or more first network devices, a notification pertaining to the policy and the end device; and
   transmit, to the application network device, the notification.

10. The system of claim 9, wherein generating the policy, the first processor is further configured to:
    identify criteria for monitoring an adherence to the application requirement in the network; and
    determine an action to perform when a violation of the application requirement occurs.

11. The system of claim 9, wherein generating the communication profile, the first processor is further configured to:
    identify, from multiple types of radio access devices of a radio access network and multiple types of core devices associated with a core network and based on the policy, a type of network device to perform the event monitoring and notification; and
    select, based on the identification, at least one of the one or more first network devices.

12. The system of claim 9, wherein the first processor is further configured to:
    determine based on the notification, whether or not the policy is violated.

13. The system of claim 9, wherein the application requirement may include one or more of the following:
    brand and model of the end device;
    location data associated with the end device;
    uptime associated with the end device;
    network state associated with the end device; and
    type of network subscription.

14. The system of claim 9, wherein the one or more first network devices include a radio access network device, a core network device, or both.

15. The system of claim 9, further comprising:
    the application network device, wherein the application network device comprises a second processor configured to:
    apply the notification to perform a network operation.

16. The system of claim 15, wherein the network operation pertains to an establishment of an application session between the application network device and the end device, or a modification of an active application session between the application network device and the end device.

17. A non-transitory computer-readable storage medium storing instructions executable by a processor of a network device, wherein the instructions are configured to:
- receive, from an application network device, a request for event monitoring and notification associated with an application, which is hosted by the application network device, an application requirement of the application network device, and an end device;
- generate, based on the request, a policy that includes policy-related network data and action data;
- generate, based on the policy and the request, a communication profile that includes the policy-related network data associated with a network subject to the event monitoring and notification, data indicating one or more first network devices to perform the event monitoring and notification, and a collection procedure that enables establishment of the event monitoring and notification with the one or more first network devices;
- establish, based on the communication profile, one or more event monitoring and notification subscriptions with the one or more first network devices;
- receive, from the one or more first network devices, a notification pertaining to the policy and the end device; and
- transmit, to the application network device, the notification.

18. The non-transitory computer-readable storage medium of claim 17, wherein the instructions to generate the policy are further configured to:
- identify criteria for monitoring an adherence to the application requirement in the network; and
- determine an action to perform when a violation of the application requirement occurs.

19. The non-transitory computer-readable storage medium of claim 17, wherein the instructions to generate the communication profile are further configured to:
- identify, from multiple types of radio access devices of a radio access network and multiple types of core devices associated with a core network and based on the policy, a type of network device to perform the event monitoring and notification; and
- select, based on the identification, at least one of the one or more first network devices.

20. The non-transitory computer-readable storage medium of claim 17, wherein the instructions are further configured to:
- determine based on the notification, whether or not the policy is violated.

* * * * *